(12) United States Patent
Boddy et al.

(10) Patent No.: US 7,090,363 B1
(45) Date of Patent: Aug. 15, 2006

(54) MIRROR ACTUATOR ASSEMBLY WITH MODULAR POSITIONAL MEMORY DEVICE

(75) Inventors: Ian Boddy, Ada, MI (US); Keith D. Foote, Kentwood, MI (US); Kris D. Brown, Lake Odessa, MI (US)

(73) Assignee: Magna Donnelly Mirrors North America L.L.C., Grand Rapids, MI (US)

( * ) Notice: Subject to any disclaimer, the term of this patent is extended or adjusted under 35 U.S.C. 154(b) by 7 days.

(21) Appl. No.: 10/708,389

(22) Filed: Feb. 27, 2004

Related U.S. Application Data (60) Provisional application No. 60/319,977, filed on Feb. 27, 2003.

(51) Int. Cl.
*G02B 7/182* (2006.01)
(52) U.S. Cl. ........................ 359/872; 359/879
(58) Field of Classification Search ............... 359/871, 359/872, 875, 879
See application file for complete search history.

(56) References Cited

U.S. PATENT DOCUMENTS

| | | | |
|---|---|---|---|
| RE27,653 E | 5/1973 | Oskam | |
| 3,972,597 A | 8/1976 | Repay et al. | |
| 4,101,206 A | 7/1978 | Oskam et al. | |
| 4,202,603 A | 5/1980 | Miyauchi | |
| 4,324,454 A | 4/1982 | Kumai | |
| 4,403,829 A | 9/1983 | Thujiuchi et al. | |
| 4,482,211 A | 11/1984 | Fisher | |
| 4,502,759 A | 3/1985 | Herzog et al. | |
| 4,598,605 A | 7/1986 | Manzoni | |
| 4,740,068 A | 4/1988 | Fisher | |
| 4,815,837 A | 3/1989 | Kikuchi et al. | |
| 4,856,885 A | 8/1989 | Fimeri | |
| 4,881,418 A | 11/1989 | Fimeri | |
| 4,915,493 A | 4/1990 | Fisher et al. | |
| 5,331,471 A | 7/1994 | Gilbert | |
| 5,355,255 A | 10/1994 | Assinder | |
| 5,436,769 A | 7/1995 | Gilbert et al. | |
| 5,467,230 A | 11/1995 | Boddy et al. | |
| 6,050,537 A | 4/2000 | Fimeri | |
| 6,094,027 A * | 7/2000 | Willmore et al. | 318/652 |
| 6,140,933 A * | 10/2000 | Bugno et al. | 340/693.5 |
| 6,142,639 A | 11/2000 | Jain et al. | |
| 6,224,220 B1 | 5/2001 | Duroux et al. | |
| 6,254,242 B1 | 7/2001 | Henion et al. | |
| 6,264,338 B1 | 7/2001 | McFarland et al. | |

* cited by examiner

Primary Examiner—Euncha P. Cherry
(74) Attorney, Agent, or Firm—McGarry Bair PC (57) ABSTRACT

A rearview mirror for a motor vehicle comprises an internal frame supporting a reflective element and a motorized tilt actuator assembly for adjusting the reflective element about perpendicular axes. The reflective element is attached to the internal frame through a pivot connection. A positional memory module comprising a separate assembly is supported by the internal frame adjacent the pivot connection for electrically determining the horizontal and vertical tilt of the reflective element at a selected position as a change in voltage through a pair of simple electrical circuits. The reflective element can be returned to the selected position by adjusting the horizontal and vertical tilt of the reflective element according to the changes in voltage.

29 Claims, 13 Drawing Sheets

MIRROR ACTUATOR ASSEMBLY WITH MODULAR POSITIONAL MEMORY DEVICE

CROSS-REFERENCE TO RELATED APPLICATION

This application claims the benefit of U.S. provisional application Ser. No. 60/319,977, filed Feb. 27, 2003, which is incorporated herein in its entirety.

FIELD OF THE INVENTION

The invention relates to mirrors for automotive vehicles. In one aspect, the invention relates to a tilt-adjustable rearview mirror comprising a modular positional memory apparatus for returning a mirror to a preselected tilt orientation.

DESCRIPTION OF THE RELATED ART

Rearview mirrors are standard equipment on automotive vehicles, and can vary considerably in size depending upon the size of the vehicle to which the mirror is attached. Rearview mirrors frequently comprise a motorized tilt actuator controlled from within the vehicle for adjusting the horizontal and vertical tilt of the mirror about a fixed pivot point. The tilt actuator can also incorporate a positional memory device which "remembers" one or more preselected tilt orientations and which can control the readjustment of the mirror to return the mirror to a preselected, memorized tilt orientation. The positional memory device comprises a pair of movable plungers whose movement corresponds to a change in a voltage through a simple electrical circuit. The plungers are attached to the mirror and move with the horizontal and vertical tilting of the mirror and return a signal representative of the horizontal and vertical position of the mirror to an onboard controller.

A large selection of tilt actuators having positional memory devices must be available to accommodate a range of mirror sizes for proper positioning of the tilt actuator away from the pivot point and the positional memory device adjacent the pivot point which increases manufacturing time and cost. Further, the failure of either the positional memory device or the tilt actuator frequently necessitates replacement of the entire assembly, leading to premature replacement of the operating part and increasing the cost of these devices.

SUMMARY OF THE INVENTION

In one aspect, the invention relates to a vehicular rearview mirror assembly, comprising: a frame; a reflective element attached at the frame for providing an occupant of the vehicle with a rearward view; a tilt actuator attached at the frame and the reflective element for selectively tilting the reflective element relative to the frame; and a positional memory element located away from the tilt actuator and interposed between the frame and the reflective element, wherein a position of the reflective element is correlated to an output signal from the positional memory element so that movement of the reflective element from a first position to a second position results in a change in said output signal.

Various embodiments of the invention are also contemplated. For example, the positional memory module can be selectively attached and removed from between the frame and the reflective element without requiring disassembly of the tilt actuator. The positional memory module can be mounted to the frame in a chamber separate from the attachment of the tilt actuator to the frame.

The positional memory module can be located adjacent to a pivot point located between the reflective element and the frame. The reflective element can be returned to the first selected position by actuating the tilt actuator until the positional memory module generates an electrical output signal which is identical to the first electrical output signal.

The positional memory module can be electrically energized. The first output signal can be electrical. The second output signal can be electrical. The frame can be a housing for the mirror. A wiper can be associated with one of the positional memory element and the frame and a contact can be associated with the other of the positional memory element and the frame, and wherein the wiper abuts the contact during movement of the positional memory element with respect to the frame. Movement of the positional memory element with respect to the frame can cause movement of the wiper with respect to the contact.

A sensor can be provided, wherein movement of the positional memory element with respect to the frame alters the output signal, wherein said output signal is received by the sensor. The sensor can detect the output signal via the Hall effect. The sensor can detect the output signal via a magnetic resonance effect. The sensor can detect the output signal without contact with the positional memory element. The sensor can detect the output signal by contact with the positional memory element.

DESCRIPTION OF THE PREFERRED EMBODIMENT

Figure 1:
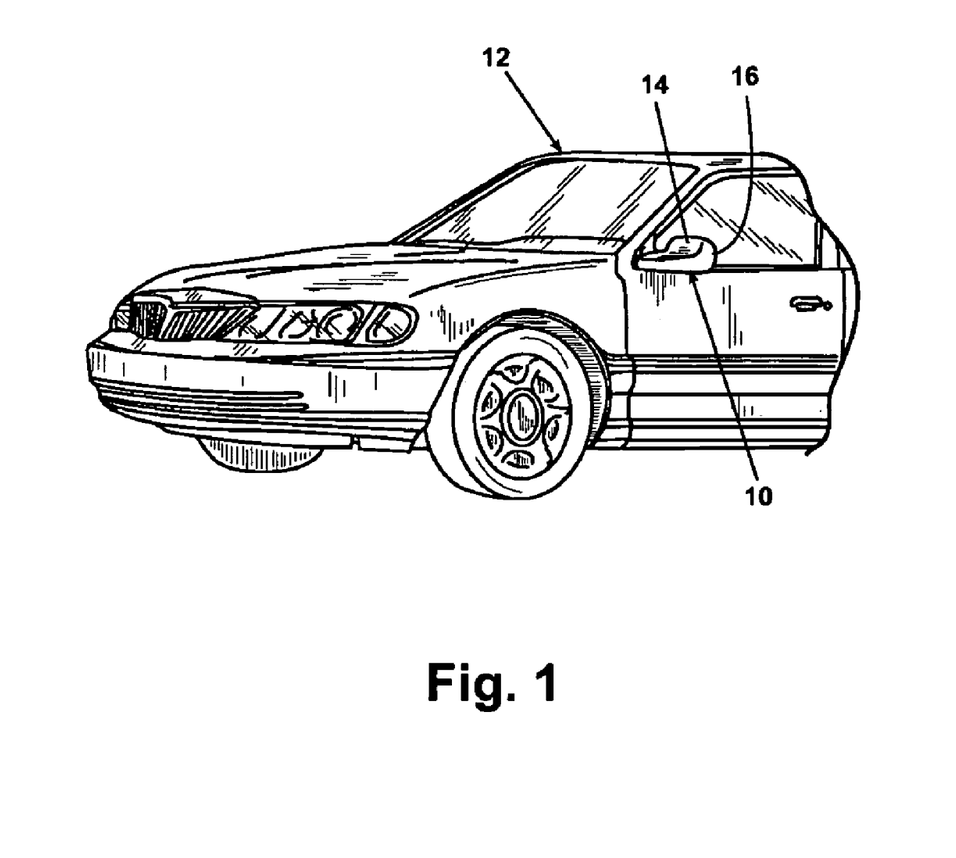
FIG. 1 is a perspective view of a portion of an automotive vehicle having a mirror assembly according to the invention.
Figure 2:
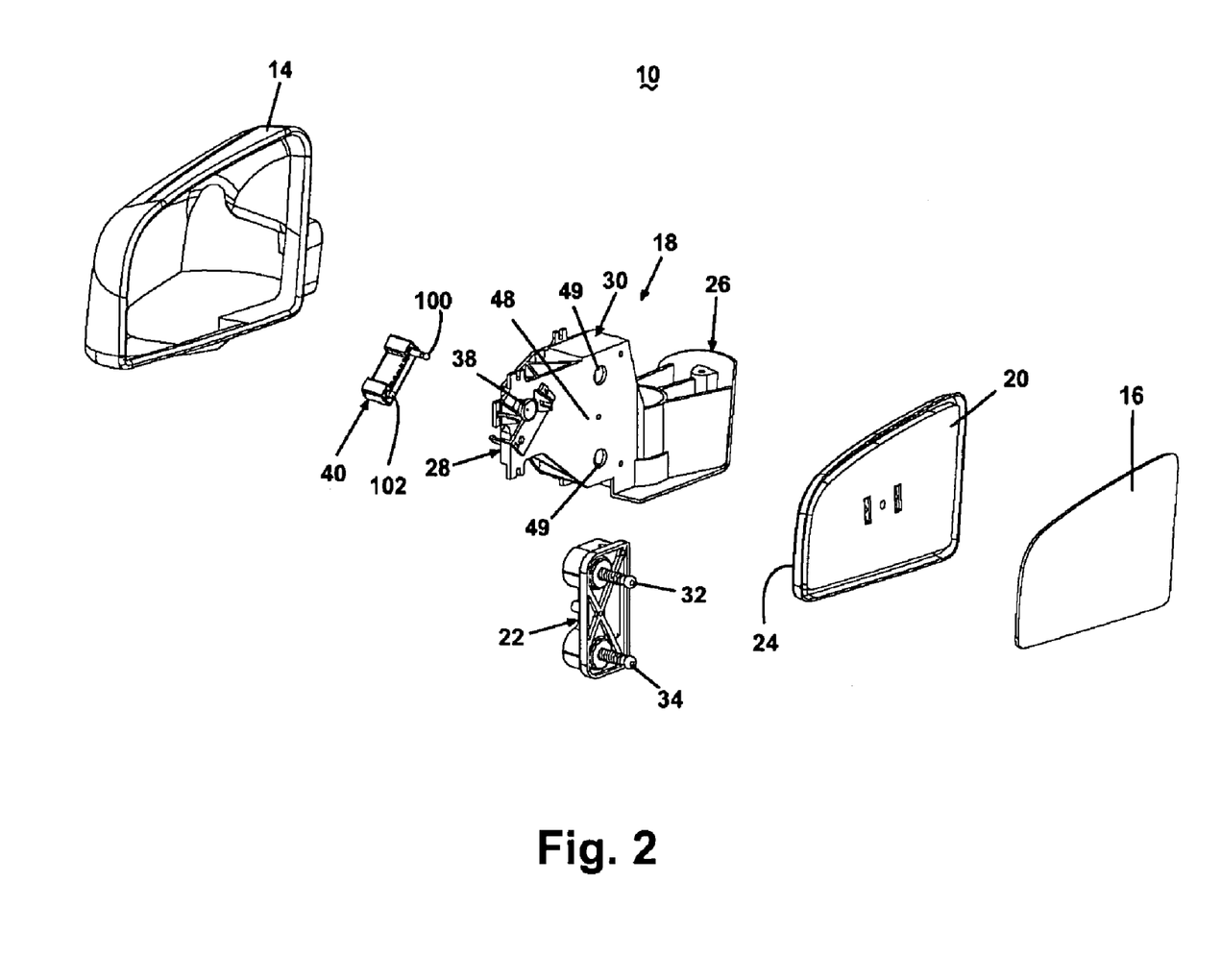
FIG. 2 is an exploded view of an embodiment of the mirror assembly shown in FIG. 1, the mirror assembly comprising an internal frame supporting a tilt actuator assembly for horizontally and vertically tilting a reflective element about a fixed pivot point and housing a positional memory module according to the invention.

Referring now to the figures and in particular to FIGS. 1 and 2, a mirror assembly 10 according to the invention is shown attached to a motor vehicle 12 in a conventional fashion. The mirror assembly 10 comprises a housing 14 enclosing a reflective element 16 attached to a glass case 20 which is tiltably mounted to a tilt actuator assembly 22 supported within a tilt actuator assembly chamber 30 comprising a portion of an internal mounting frame 18. The internal mounting frame 18 comprises a support end 26 which is attached to the vehicle 12, a cantilever end 28 which extends away from the vehicle 12, and a glass case side 48 intermediate the support end 26 and the cantilever end 28 and facing a reflector side 24 of the glass case 20. In the embodiment shown in the figures, the tilt actuator assembly 22 is located proximate the support end 26.

The tilt actuator assembly 22 comprises an upper jackscrew 32 and a lower jackscrew 34 which extend through jackscrew apertures 49 in the glass case side 48 and are pivotably attached to the frame side 24 of the glass case 20 for tilting the glass case 20 and the reflective element 16 when the jackscrews 32, 34 are selectively extended and retracted. The tilt actuator assembly 22 can comprise a single motor or a dual motor tilt actuator assembly. An example of a suitable tilt actuator assembly is described in U.S. patent application Ser. No. 60/319,753, filed Dec. 4, 2002, entitled "Bottom-Load Actuator for Vehicular Rearview Mirror," which is incorporated herein by reference.

Figure 3:
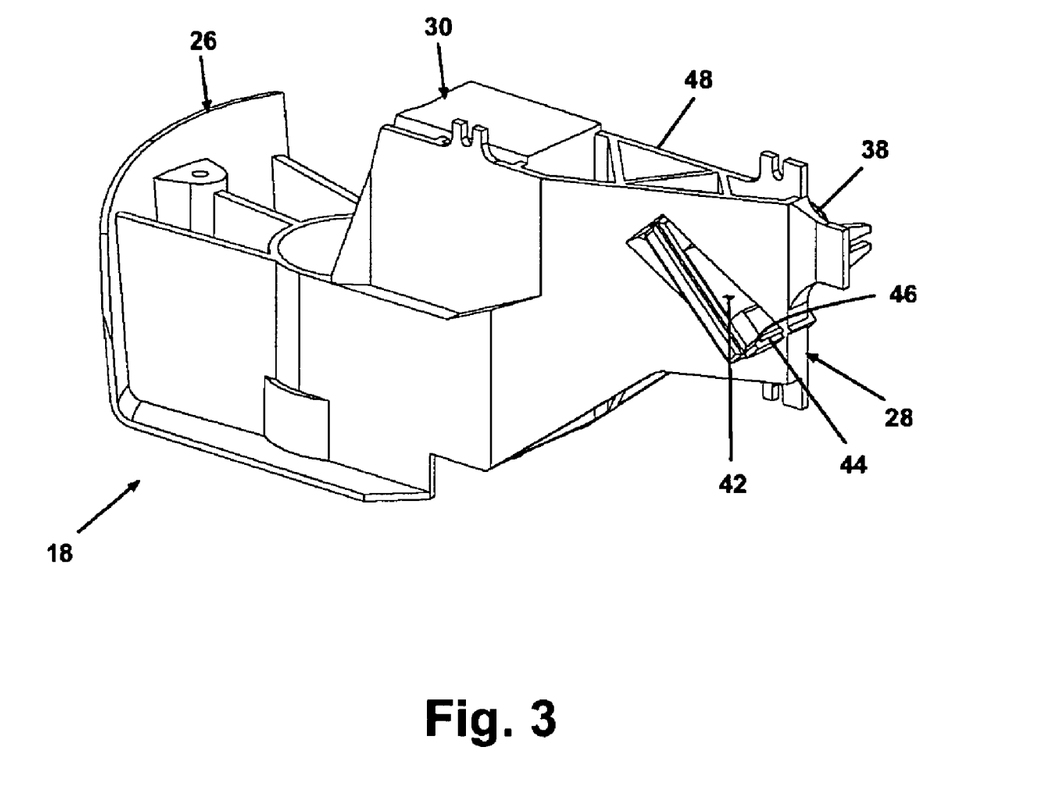
FIG. 3 is a close-up perspective view of a first side of the internal frame shown in FIG. 2 showing the positional memory module supported in the internal frame.
Figure 5:
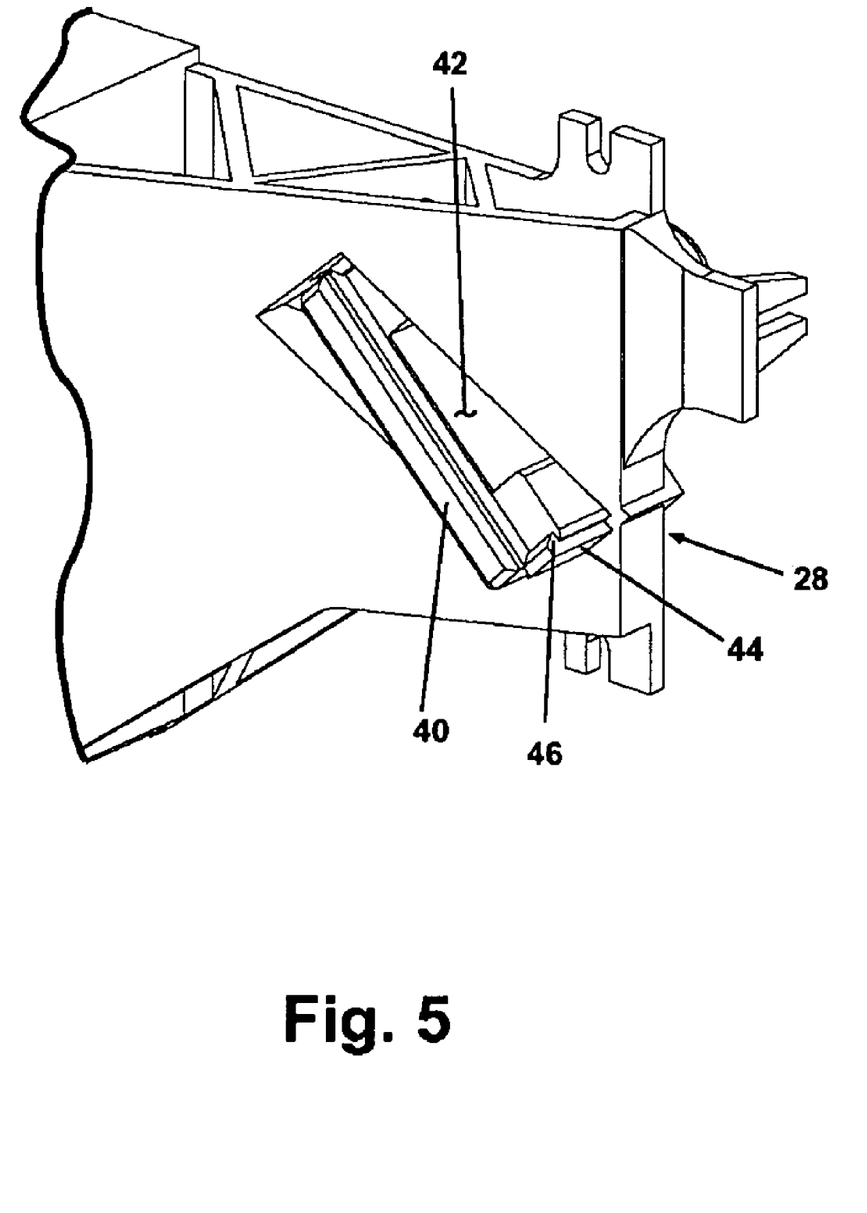
FIG. 5 is a close-up perspective view of the positional memory module supported in the internal frame shown in FIG. 3.

As shown also in FIGS. 3 and 5, a positional memory module 40 according to the invention is also supported within a generally rectilinear memory module chamber 42 comprising a portion of the internal mounting frame 18 at the cantilever end 28. Extending outwardly of the internal mounting frame 18 adjacent the memory module chamber 42 is a flexible finger 44 having a hook 46 at a free end thereof for engaging the positional memory module 40 in an interference fit as hereinafter described. The internal frame 18 is also provided with a pivot pedestal 38 which is pivotably attached to the frame side 24 of the glass case 20 and comprises a fixed point about which the glass case 20 and the reflective element 16 can pivot.

Figure 4:
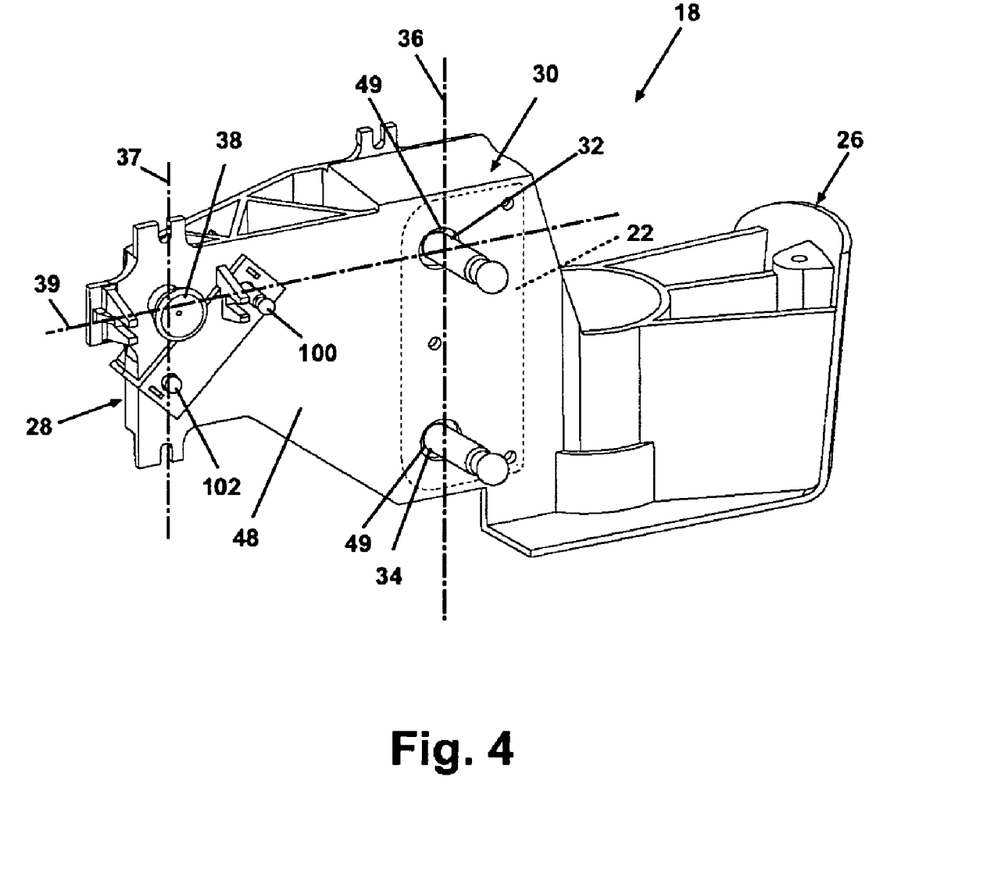
FIG. 4 is a close-up perspective view of a second side of the internal frame shown in FIG. 3 showing a pair of movable plunger assemblies comprising a portion of the positional memory module extending from the internal frame adjacent the fixed pivot point.

As shown in FIG. 4, the tilt actuator assembly 22 is enclosed within the internal mounting frame 18 so that the jackscrews 32, 34 define a jackscrew axis 36 which is oriented generally vertically when the mirror assembly 10 is attached to the motor vehicle 12. The pivot pedestal 38 is attached to the internal mounting frame 18 so that the pivot pedestal 38 and the upper jackscrew 32 define a horizontal pivot axis 39 which is orthogonal to the jackscrew axis 36.

Figure 6:
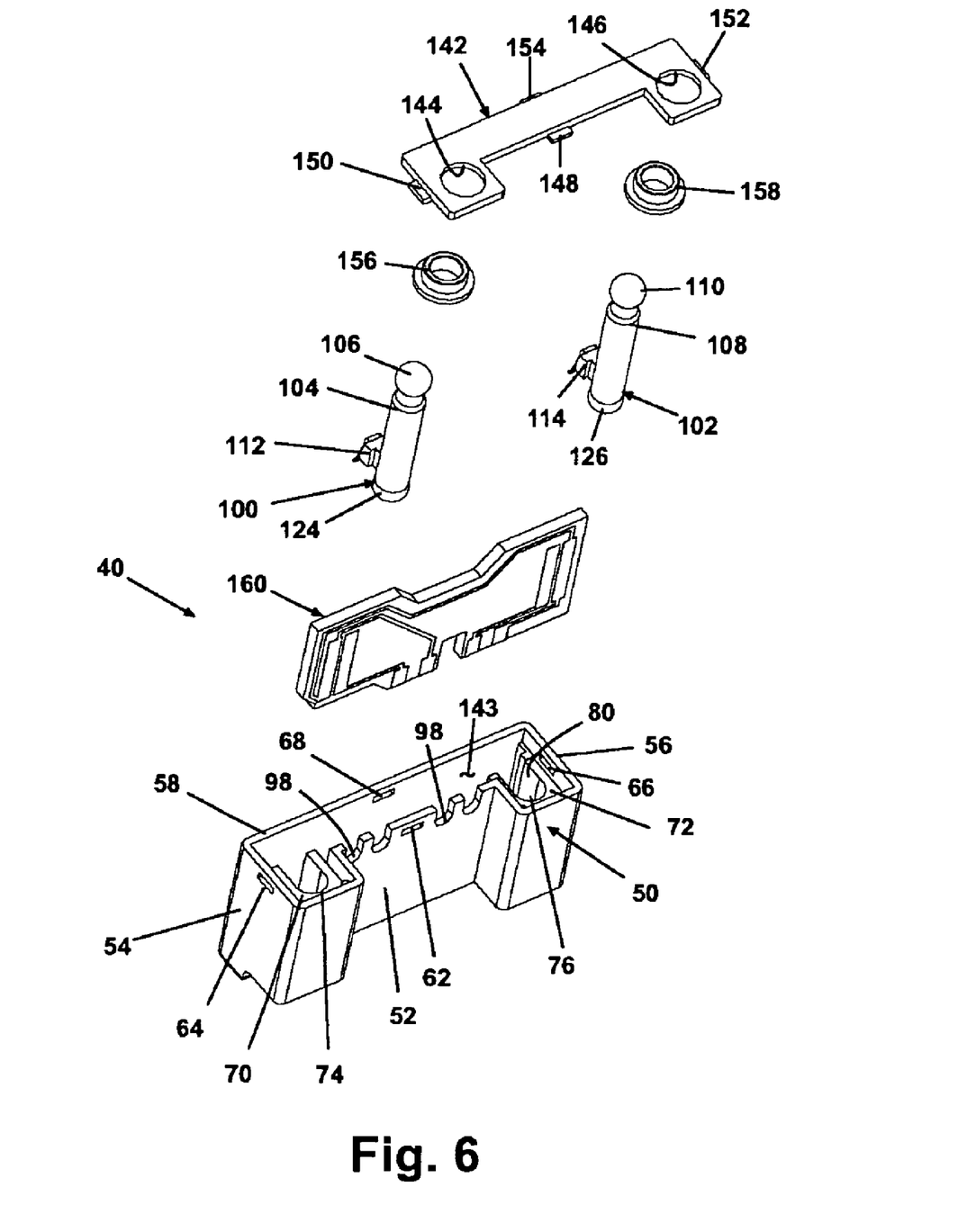
FIG. 6 is a first exploded view of the positional memory module shown in FIG. 2.
Figure 7:
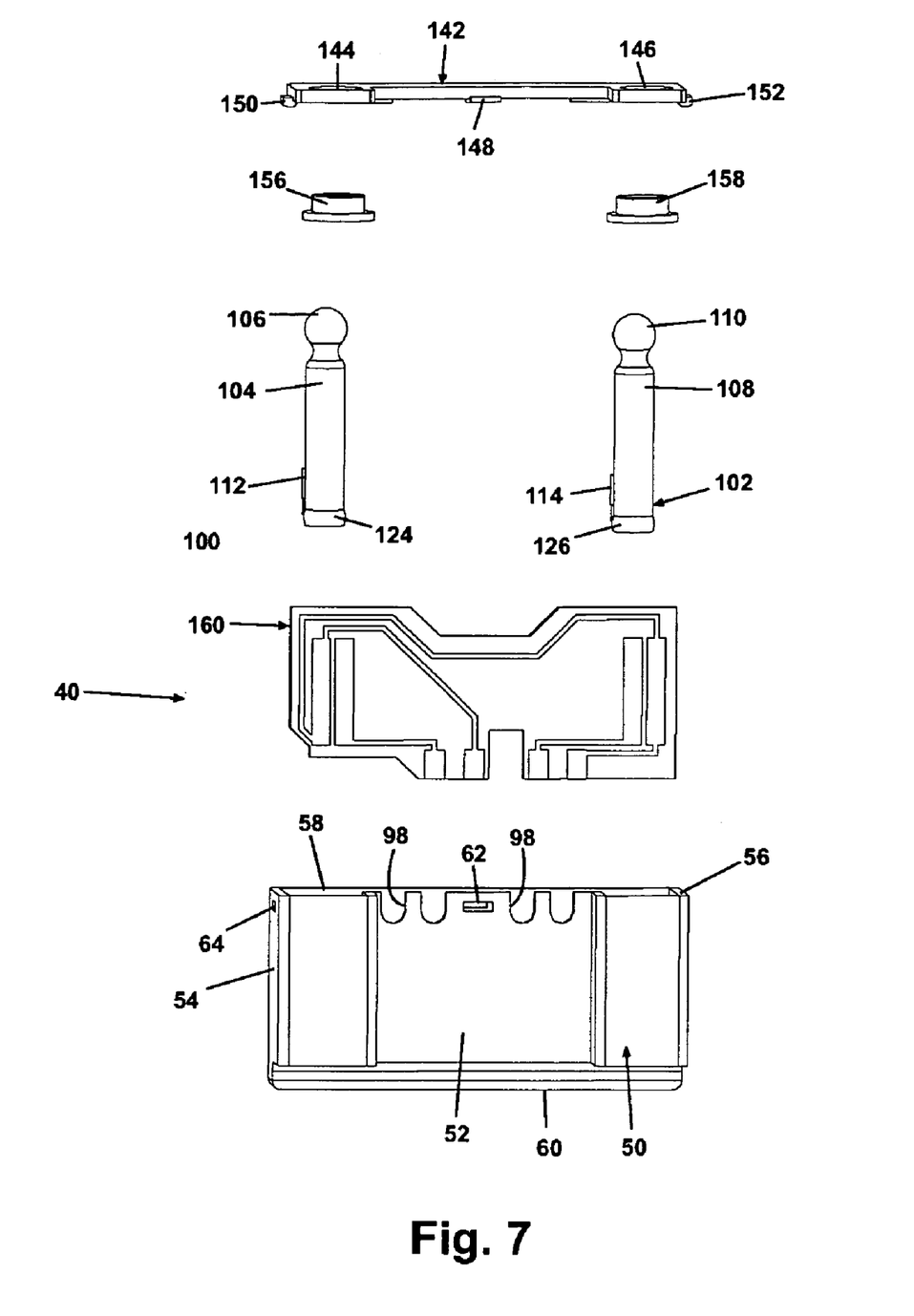
FIG. 7 is a second exploded view of the positional memory module shown in FIG. 2.
Figure 8:
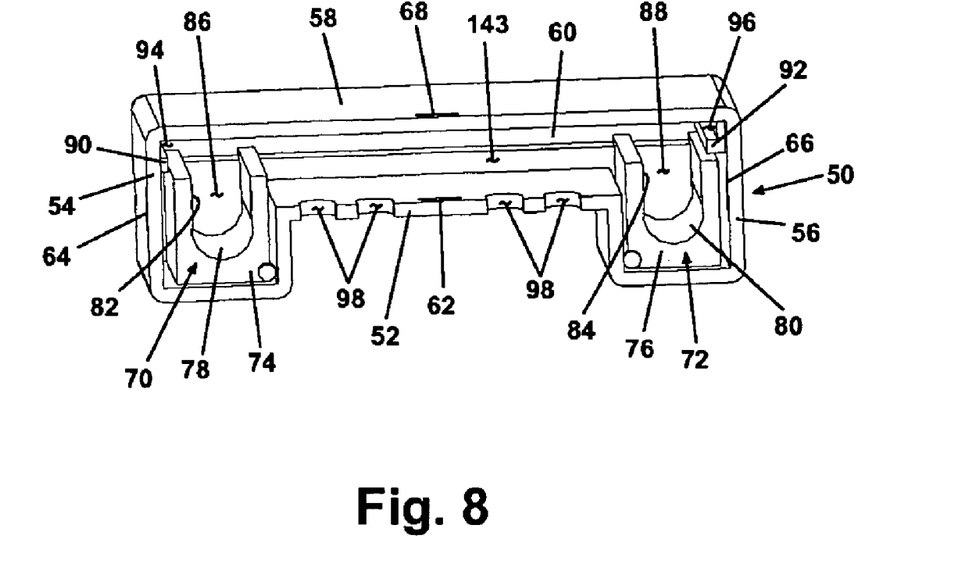
FIG. 8 is a perspective view of a memory module base comprising a portion of the positional memory module shown in FIG. 2.

Referring now to FIGS. 6–8, the positional memory module 40 comprises a generally rectilinear memory module base 50, adapted for slidable insertion into the memory module chamber 42, and a generally rectilinear removable memory module cover 142, the memory module base 50 and the memory module cover 142 defining a chamber 143 enclosing a first plunger 100, a second plunger 102, and a circuit board 160. The memory module base 50 comprises a front wall 52, a first sidewall 54 and a second sidewall 56 in parallel, spaced-apart juxtaposition extending orthogonally away from the front wall 52, and a rear wall 58 extending from the first sidewall 54 to the second sidewall 56 in parallel, spaced-apart juxtaposition to the front wall 52. The walls 52–58 transition to a bottom wall 60 extending orthogonally thereto. In the preferred embodiment, the front wall 52 is provided with a front cover slot 62 extending therethrough, and a plurality of wiring pass-throughs 98.

In the preferred embodiment, the side walls 54, 56 are provided with side cover slots 64, 66, respectively, extending therethrough, and the rear wall 58 is provided with a rear cover slot 68 extending therethrough. The walls 52–60 define a first plunger chamber 70 and a second plunger chamber 72 in spaced-apart juxtaposition. The first plunger chamber 70 comprises a first plunger cradle 74 having a first cylindrical portion 78 and a first cradle extension 82 to define a first plunger seat 86. The second plunger chamber 72 comprises a second plunger cradle 76 having a second cylindrical portion 80 and a second cradle extension 84 to define a second plunger seat 88.

Referring specifically FIG. 8, a first rib 90 is an elongated protuberance extending from the first sidewall 54 into the first plunger chamber 70 in spaced-apart juxtaposition to the rear wall 58 to define a first slot 94. A second rib 92 is an elongated protuberance extending from the second sidewall 56 into the second plunger chamber 72 in spaced-apart juxtaposition to the rear wall 58 to define a second slot 96.

Figure 9:
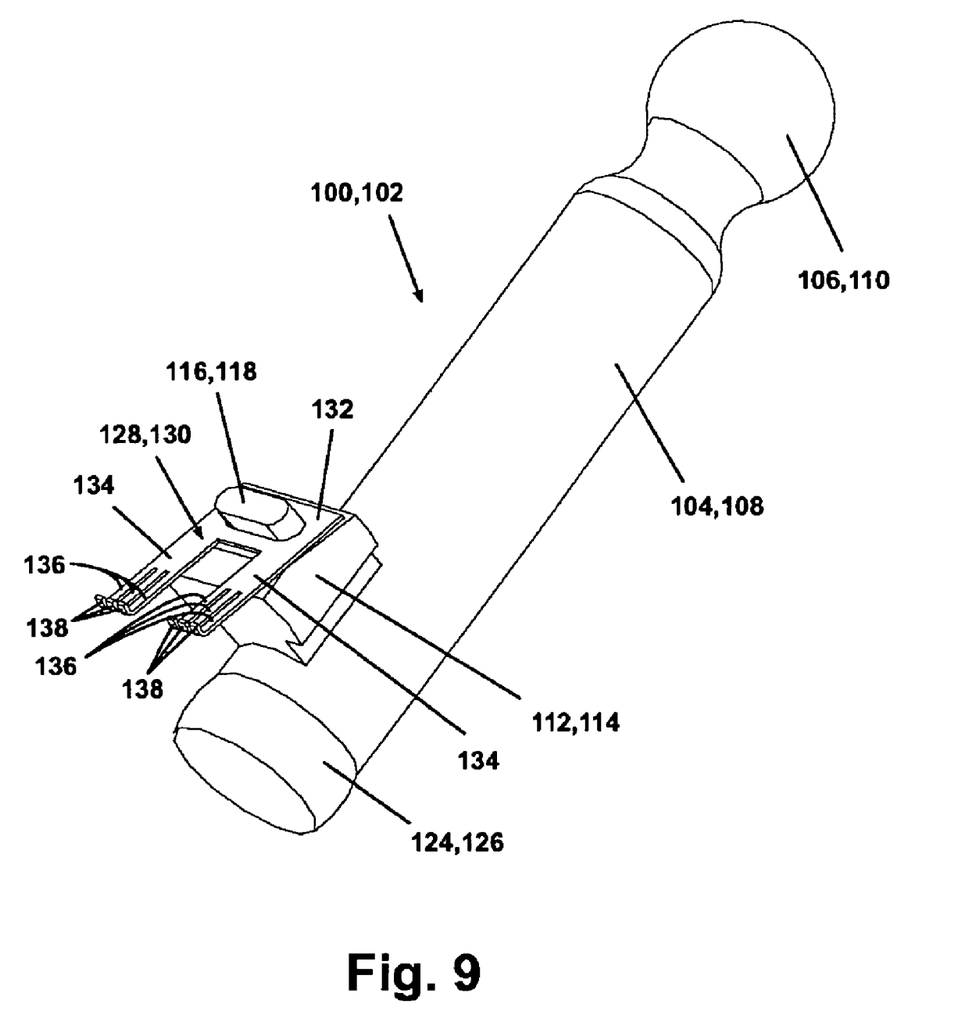
FIG. 9 is a close-up perspective view of a plunger assembly shown in FIG. 4 comprising a plunger and a sweeper.
Figure 10:
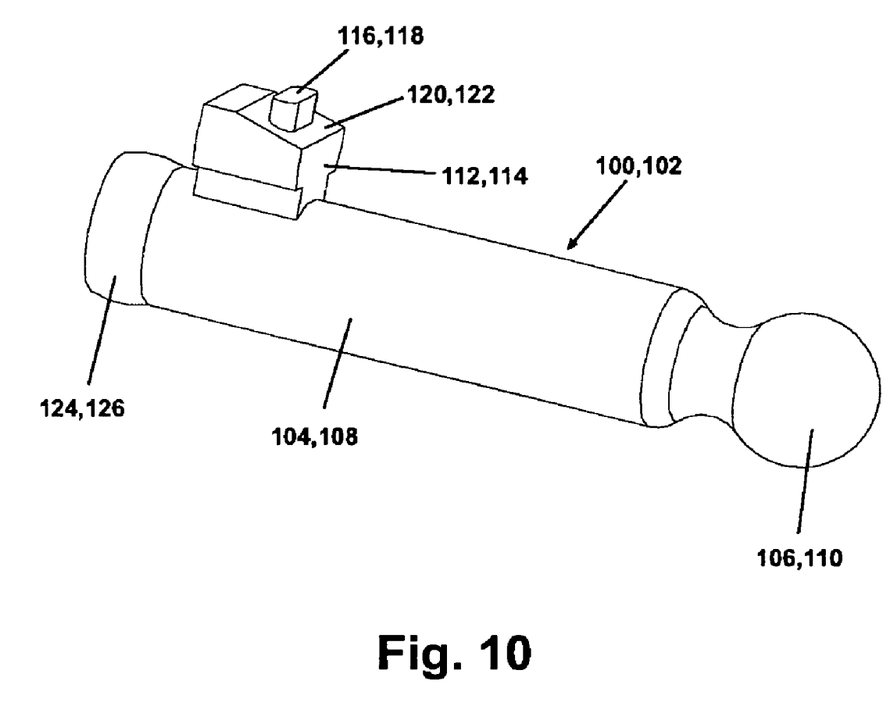
FIG. 10 is a close-up perspective view of the plunger shown in FIG. 9.
Figure 11:
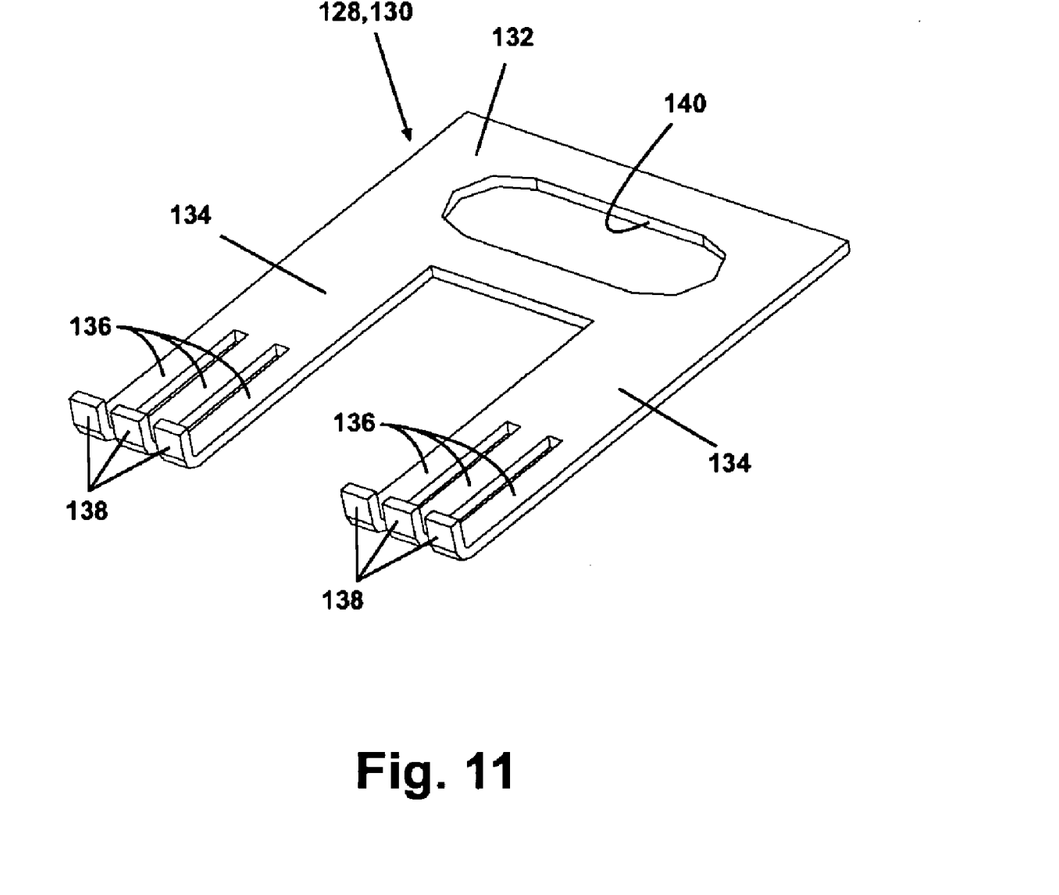
FIG. 11 is a close-up perspective view of the sweeper shown in FIG. 9.

FIGS. 6 and 7 show a first plunger 100 in cooperative association with the first plunger chamber 70 and a second plunger 102 in cooperative association with the second plunger chamber 72. FIGS. 9–11 show the plungers 100, 102 in detail, the plungers 100, 102 being identical. The first plunger 100 is an elongated, generally cylindrical member comprising a cylindrical first shaft 104 transitioning at a first end to a first ball 106 and at a second end to a first plunger bead 124 comprising a somewhat enlarged collar-like portion encircling the shaft 104 and having a diameter somewhat greater than the diameter of the shaft 104. Similarly, the second plunger 102 is an elongated, generally cylindrical member comprising a cylindrical second shaft 106 transitioning at a first end to a second ball 108 and at a second end to a second plunger bead 126 comprising a somewhat enlarged collar-like portion encircling the shaft 106 and having a diameter somewhat greater than the diameter of the shaft 106. Preferably, the plungers 100, 102 are fabricated of a rigid thermoplastic material having suitable strength for the purposes described herein.

The first plunger 100 is provided with a first sweeper support 112 extending radially outwardly of the first shaft 104 adjacent the first plunger bead 124. The first sweeper support 112 is provided with a planar first inclined surface 120 and a first sweeper lug 116 extending away from the first inclined surface 120. The second plunger 102 is provided with a second sweeper support 114 extending radially outwardly of the second shaft 106 adjacent the second plunger bead 126. The second sweeper support 114 is provided with a planar second inclined surface 122 and a second sweeper lug 118 extending away from the second inclined surface 122. The sweeper support 112, 114 is adapted for fixedly attaching a sweeper as hereinafter described.

The first plunger 100 is adapted for slidable communication between the first plunger bead 124 and the first cylindrical portion 78 of the first plunger cradle 74. The first sweeper support 112 is adapted for slidable communication with the first cradle extension 82. The first plunger 100 can thus slidably translate within the first plunger opening 86. Similarly, the second plunger 102 is adapted for slidable communication between the second plunger bead 126 and the second cylindrical portion 80 of the second plunger cradle 76. The second sweeper support 114 is adapted for slidable communication with the second cradle extension 84. The second plunger 102 can thus slidably translate within the second plunger opening 88.

A sweeper is a generally U-shaped, platelike body, fabricated of an electrically-conductive material such as steel or copper, comprising a crosspiece 132 having an elongated lug aperture 140 therethrough, and a pair of parallel, spaced-apart sweeper arms 134 extending orthogonally from the crosspiece 132. Each sweeper arm 134 terminates in a plurality of parallel, spaced-apart sweeper fingers 136, shown in FIG. 11 as numbering three per arm 134. Each sweeper finger 136 terminates in a contact 138 extending orthogonally thereto. The lug aperture 140 is adapted for slidable receipt of a sweeper lug 116, 118. The sweeper 128, 130 is attached to the sweeper support 112, 114 by inserting the sweeper lug 116, 118 into the lug aperture 140 so that the sweeper 128, 130 is in cooperative communication with the inclined surface 120, 122, respectively. The sweeper 128, 130 is retained against the inclined surface 120, 122 by welding, heat deformation of the sweeper lug 116, 118, or other suitable means.

Figure 12:
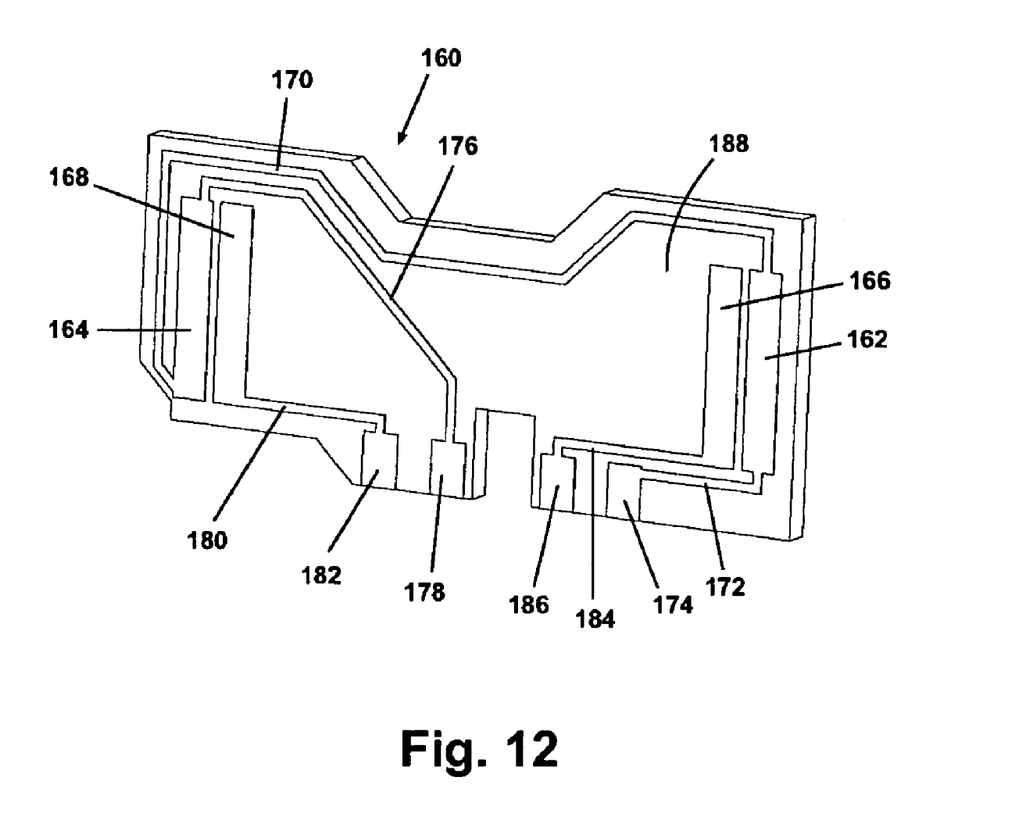
FIG. 12 is a close-up perspective view of a circuit board comprising a portion of the positional memory module shown in FIG. 6.

The circuit board 160 comprises a platelike, generally rectilinear body comprising a generally conventional printed circuit board substrate material 188. The circuit board 160 is adapted for slidable insertion into the slots 94, 96 parallel to and spaced somewhat away from the rear wall 58. A plurality of contact strips, conductive leads, and conductive contacts are applied to the substrate material 188 in a conventional manner, such as by sputtering or printing. It will be understood that the circuit board 160, although shown by example in the drawings as a printed circuit board with conductive/resistive strips on only one side, the circuit board 160 can also have the conductive/resistive strips on both sides of the printed circuit board as would be known to one skilled in the art.

The circuit board 160 comprises a first outer contact strip 164 and a first inner contact strip 168 in parallel, spaced-apart juxtaposition along a first edge of the circuit board 160 for cooperative association with the first plunger chamber 70 when the circuit board 160 is inserted into the memory module base 58. Similarly, the circuit board 160 comprises a second outer contact strip 162 and a second inner contact strip 166 in parallel, spaced-apart juxtaposition along a second edge of the circuit board 160 for cooperative association with the second plunger chamber 72 when the circuit board 160 is inserted into the memory module base 158. Preferably, the inner contact strips 166, 168 comprise an electrically-resistive material whose electrical resistance varies along the length of the strip 166, 168. Preferably, the outer contact strips 162, 164 comprise an electrically-conductive material.

The first outer contact strip 164 is connected through a connecting lead 170 to the second outer contact strip 162. The second outer contact strip 162 is connected through a connecting lead 172 to a second conductive contact 174. The first outer contact strip 164 is also connected through a connecting lead 176 to a first conductive contact 178. The first inner contact strip 168 is connected through a connecting lead 180 to a first resistive contact 182, and of the second inner contact strip 166 is connected through a connecting lead 184 to a second resistive contact 186. The contacts 174, 178, 182, 186, are connected through suitable electrical wiring passing through the wiring pass-throughs 98 for integration into a wiring harness or other suitable electrical connector for operable communication with the vehicle control system. The contact strips 162–168 are adapted for slidable communication with the contacts 138 when the plungers 100, 102 are inserted into the plunger chambers 70, 72. The inclination of the sweepers 128, 130 due to the inclination of the inclined surfaces 120, 122 ensures that the contacts 138 are in suitable electrical communication with the contact strips 162–168.

Figure 13:
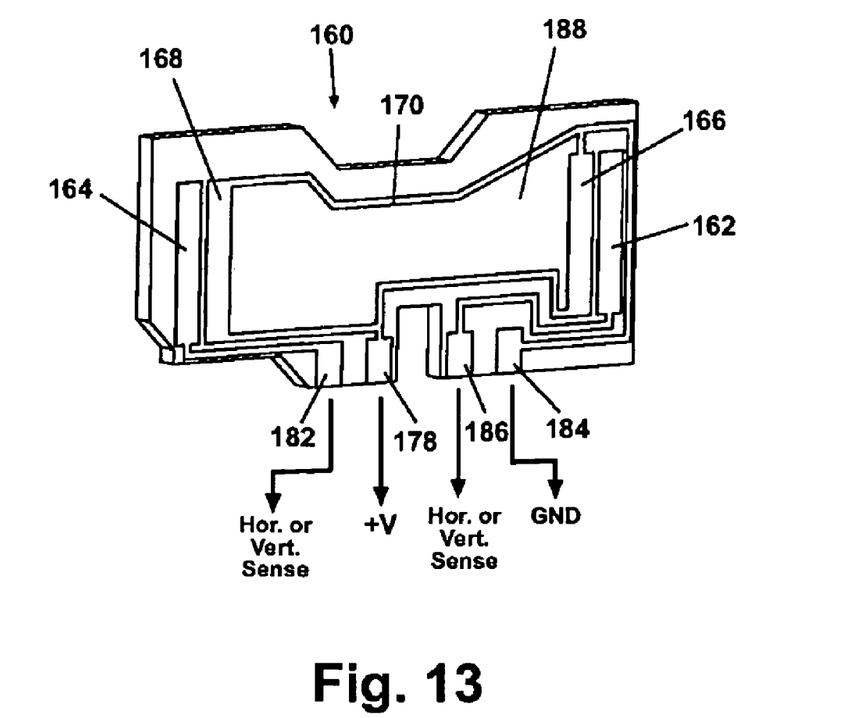
FIG. 13 is a close-up perspective view of an alternative embodiment of the circuit board shown in FIG. 12.

An alternative, preferred embodiment of the circuit board 160 is shown in FIG. 13 in which like reference numerals are used to identify like elements between the embodiments of the circuit board 160 shown in FIGS. 12 and 13, respectively. The embodiments are very similar but differ in that the resistive strips are located as the first and second outer contact strips 162, 164 and the conductive voltage strips are provided as the first and second inner contact strips 166 and 168. The first and second inner contact strips 166 and 168 are interconnected by the common connecting lead 170. The common circuitry defined by the common connecting lead 170 and the first and second inner contact strips 166 and 168 initiate and terminate in contacts 178 and 184 which are respectively connected to a positive voltage source and ground as indicated in FIG. 13. Contacts 182 and 186 are interconnected to a mirror position control unit and supply a signal representative of the position of the mirror with respect to horizontal and vertical axes as is described further herein.

Figure 14:
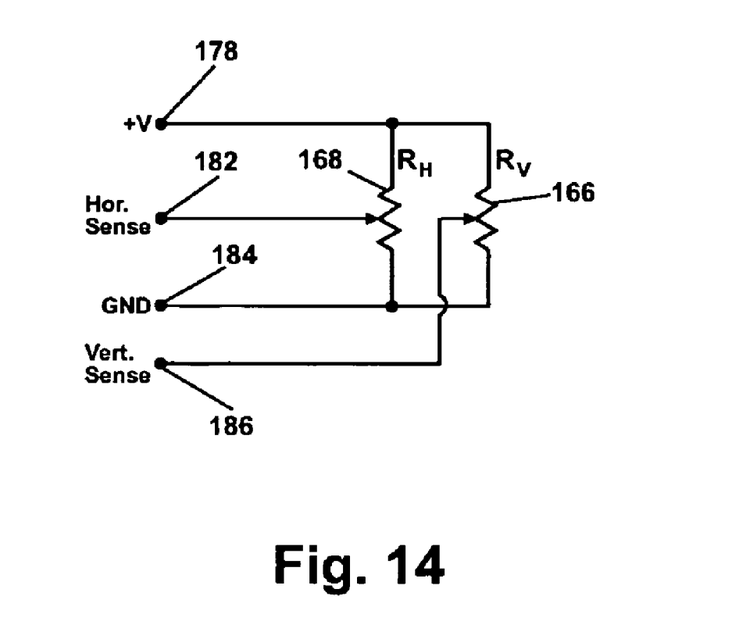
FIG. 14 is a schematic view showing an exemplary circuit diagram applicable to both embodiments of the circuit board shown in FIGS. 12–13.

A schematic of both of the embodiments in FIGS. 12–13 is shown in FIG. 14 wherein like reference numerals are employed to identify elements common to the schematic and the FIGS. 12–13 embodiments.

The memory module cover 142 is a generally rectilinear, plate-like body comprising a circular first plunger aperture 144 and a circular second plunger aperture 146 extending therethrough in spaced-apart juxtaposition for cooperative association with the first plunger chamber 70 and the second plunger chamber 72, respectively. The memory module cover 142 also comprises a front cover tab 148 for interference-type communication with the front cover slot 62, a first side cover tab 150 for interference-type communication with the side cover slot 64, a second side cover tab 152 for interference-type communication with the side cover slot 66, and a rear cover tab 154 for interference-type communication with the rear cover slot 68. A pair of rubber seals 156, 158 are adapted for liquid-tight insertion into the plunger apertures 144, 146, respectively, and slidable, generally liquid-tight receipt of the shafts 104, 108, respectively, of the plungers 100, 102, respectively. The memory module cover 142 is used to close the chamber 143 after the placement of the plungers 100, 102 and the circuit board 160 in the chamber 143 so that the plungers 100, 102 extend through the rubber seals 156, 158.

The memory module 40 is then slidably inserted into the memory module chamber 42 so that the plungers 100, 102 extend through suitable apertures (not shown) in the mounting frame 18 toward the frame side 24 of the glass case 20 and the hook 46 engages the bottom wall 60 to retain the memory module 40 in the memory module chamber 42. Referring again to FIG. 4, the first plunger 100 is aligned with the horizontal pivot axis 39 intermediate the pivot pedestal 38 and the upper jackscrew 32, and the second plunger 102 is aligned with the pivot pedestal 38 to define a vertical pivot axis 37 orthogonal to the horizontal pivot axis 39 and parallel to the jackscrew axis 36. The balls 106, 110 are then pivotably attached in a generally conventional manner to the glass case 26 so that, when the glass case 20 is pivoted by the extension and retraction of the jackscrews 32, 34, the plungers 100, 102 will be urged into and out of the plunger chambers 70, 72, respectively.

As an example, referring to FIG. 4, if the glass case 20 is tilted about the horizontal pivot axis 39 through the operation of the lower jackscrew 34, the second plunger 102 will be moved with the tilting of the glass case 20. As the lower jackscrew 34 is extended, the second plunger 102 will be extended. Conversely, as the lower jackscrew 34 is retracted, the second plunger 102 will be retracted. Similarly, if the glass case 20 is tilted about the vertical pivot axis 37 through the operation of both the jackscrews 32, 34, the plunger 100 will be moved with the tilting of the glass case 20. The plunger 102 will not be moved since it lies along the vertical pivot axis 37. As the jackscrews 32, 34 are extended, the plunger 100 will be extended. Conversely, as the jackscrews 32, 34 are retracted, the plunger 100 will be retracted.

With reference now to FIGS. 9 and 12, the circuit board 160 is electrically powered by the vehicle's electrical power system (typically 5-volt, 12-volt or other suitable electrical configuration) so that an electrical current flows across the connecting leads 170, 172, 176, 180 and energizes the contact strips 162–168. While the description herein is with respect to the embodiment of the circuit board 160 in FIG. 12, the description can be equally applied to the embodiment for the circuit board 160 shown in FIG. 13 without departing from the scope of this invention and as would be apparent to one skilled in the art.

Current can flow between a pair of inner and outer contact strips, such as the second outer contact strip 162 and the second inner contact strip 166, through the second sweeper 130. Thus, current can flow across the second conductive contact 174 through the connecting lead 172 to the second outer contact strip 162, across the second sweeper 130 to the second inner contact strip 166, through the connecting lead 184 and across the second resistive contact 186. As the plungers 100, 102 are extended and retracted as described above, the contacts 138 will move along the contact strips, such as the second outer contact strip 162 and the second inner contact strip 166. Because the inner contact strip 166 comprises a resistive material, as the contacts 138 move along the inner contact strip 166, the resistance of the inner contact strip 166 will change. Thus, the voltage across the contacts 174, 186 will vary with the variation in resistance resulting from the movement of the second sweeper 130 along the second inner contact strip 166. This voltage can be measured and its value stored, and will correspond to a first selected horizontal and/or vertical tilt position, and a first plunger position. If the reflective element 16 and the glass case 20 have been tilted to a second selected horizontal and/or vertical tilt position, thereby moving the plungers 100, 102 to a second plunger position, the tilt actuator assembly 22 can be activated so that the plungers 100, 102 are returned to the first plunger position. The tilt actuator assembly 22 can be programmed to stop when the voltages from the positions of the plungers 100, 102 match the stored voltage values for the selected horizontal and/or vertical tilt position.

The positional memory module 40 described herein comprises a separate module from the tilt actuator assembly 22 so that a mirror assembly 10 can be readily provided with or without the positional memory module 40. The positional memory module 40 can be optimally positioned relative to the pivot pedestal 38 regardless of the size of the internal mounting frame 18 or the mirror assembly 10. The use of a separate positional memory module 40 eliminates the necessity of having a combined tilt actuator and positional memory device in a range of sizes for different sized mirror assemblies, as well as the increased design and tooling complexity and costs, including the increased sealing complexity, inherent in a combined tilt actuator and positional memory device. The positional memory module 40 can also be readily removed for repair and/or maintenance without the necessity of removing the tilt actuator assembly 22, or without the necessity of replacing both the tilt actuator and positional memory device when only the positional memory device needs replacing.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The invention claimed is:

1. A vehicular rearview mirror assembly, comprising:
a frame;
a reflective element attached at the frame for providing an occupant of the vehicle with a rearward view;
a motorized tilt actuator adapted for selectively tilting the reflective element relative to the frame; and
a positional memory element located away from the tilt actuator coupling the frame with the reflective element, wherein a position of the reflective element relative to the frame is correlated to an output signal from the positional memory element so that movement of the reflective element from a first position to a second position results in a change in said output signal.

2. A vehicular rearview mirror assembly according to claim 1, wherein the positional memory element is selectively attached and removed from between the frame and the reflective element without requiring disassembly of the tilt actuator.

3. A vehicular rearview mirror assembly according to claim 1, wherein the positional memory element is mounted to the frame in a chamber separate from the attachment of the tilt actuator to the frame.

4. A vehicular rearview mirror assembly according to claim 1, wherein the positional memory element is located adjacent to a pivot point located between the reflective element and the frame.

5. A vehicular rearview mirror assembly according to claim 1, wherein the reflective element is returned to the first position by actuating the tilt actuator until the positional memory element generates an electrical output signal which is identical to the output signal corresponding to the first position.

6. A vehicular rearview mirror assembly according to claim 1, wherein the positional memory element is electrically energized.

7. A vehicular rearview mirror assembly according to claim 1, wherein the output signal is electrical.

8. A vehicular rearview mirror assembly according to claim 1, wherein said change in said output signal comprises a change in an electrical signal.

9. A vehicular rearview mirror assembly according to claim 1, wherein the frame is a housing for the reflective element.

10. A vehicular rearview mirror assembly according to claim 1, and further comprising a wiper associated with one of the positional memory element and the frame and a contact associated with the other of the positional memory element and the frame, and wherein the wiper abuts the contact during movement of the positional memory element with respect to the frame.

11. A vehicular rearview mirror assembly according to claim 10, wherein movement of the positional memory element with respect to the frame causes movement of the wiper with respect to the contact.

12. A vehicular rearview mirror assembly according to claim 1, and further comprising a sensor, wherein movement of the positional memory element with respect to the frame alters the output signal, wherein said output signal is received by the sensor.

13. A vehicular rearview mirror assembly according to claim 12, wherein the sensor detects the output signal via the Hall effect.

14. A vehicular rearview mirror assembly according to claim 12, wherein the sensor detects the output signal via a magnetic resonance effect.

15. A vehicular rearview mirror assembly according to claim 12, wherein the sensor detects the output signal without contact with the positional memory element.

16. A vehicular rearview mirror assembly according to claim 12, wherein the sensor detects the output signal by contact with the positional memory element.

17. A vehicular rearview mirror assembly, comprising:
   a frame;
   a reflective element attached to the frame for providing an occupant of the vehicle with a rearward view;
   a motorized tilt actuator adapted for selectively tilting the reflective element relative to the frame; and
   a positional memory element contained within a modular housing located away from the tilt actuator coupling the frame with the reflective element, wherein a position of the reflective element relative to the frame is correlated to an output signal from the positional memory element so that movement of the reflective element from a first position to a second position results in a change in said output signal;
   wherein the modular housing containing the positional memory element can be selectively coupled to and decoupled from the frame and the reflective element without requiring disassembly of the tilt actuator.

18. A vehicular rearview mirror assembly according to claim 17, wherein the positional memory element is mounted to the frame in a chamber separate from the attachment of the tilt actuator to the frame.

19. A vehicular rearview mirror assembly according to claim 17, wherein the positional memory element is located adjacent to a pivot point located between the reflective element and the frame.

20. A vehicular rearview mirror assembly according to claim 17, wherein the reflective element is returned to the first position by actuating the tilt actuator until the positional memory element generates an electrical signal which is identical to the output signal corresponding to the first position.

21. A vehicular rearview mirror assembly according to claim 17, wherein said change in said output signal comprises a change in an electrical signal.

22. A vehicular rearview mirror assembly according to claim 17, wherein the frame is a housing for the reflective element.

23. A vehicular rearview mirror assembly according to claim 17, and further comprising a wiper associated with one of the positional memory element and the frame and a contact associated with the other of the positional memory element and the frame, and wherein the wiper abuts the contact during movement of the positional memory element with respect to the frame.

24. A vehicular rearview mirror assembly according to claim 23, wherein movement of the positional memory element with respect to the frame causes movement of the wiper with respect to the contact.

25. A vehicular rearview mirror assembly according to claim 17, and further comprising a sensor, wherein movement of the positional memory element with respect to the frame alters the output signal and said output signal is received by the sensor.

26. A vehicular rearview mirror assembly according to claim 25, wherein the sensor detects the output signal via the Hall effect.

27. A vehicular rearview mirror assembly according to claim 25, wherein the sensor detects the output signal via a magnetic resonance effect.

28. A vehicular rearview mirror assembly according to claim 25, wherein the sensor detects the output signal without contact with the positional memory element.

29. A vehicular rearview mirror assembly according to claim 25, wherein the sensor detects the output signal by contact with the positional memory element.

* * * * *